United States Patent [19]

Murakami

[11] Patent Number: 5,788,908
[45] Date of Patent: Aug. 4, 1998

[54] METHOD FOR PRODUCING LONG FIBER-REINFORCED THERMOPLASTIC RESIN COMPOSITION

[75] Inventor: Haruji Murakami, Fuji, Japan

[73] Assignee: Polyplastics Co., Ltd., Osaka, Japan

[21] Appl. No.: 676,171

[22] PCT Filed: Aug. 19, 1994

[86] PCT No.: PCT/JP94/01370

§ 371 Date: Jul. 15, 1996

§ 102(e) Date: Jul. 15, 1996

[87] PCT Pub. No.: WO96/05956

PCT Pub. Date: Feb. 29, 1996

[51] Int. Cl.$^6$ .................................................. B29B 9/06
[52] U.S. Cl. .......................... 264/136; 156/166; 156/180; 264/143; 264/171.13
[58] Field of Search ............................. 264/136, 137, 264/143, 171.13; 156/166, 180

[56] References Cited

U.S. PATENT DOCUMENTS

| | | | |
|---|---|---|---|
| 3,993,726 | 11/1976 | Moyer | 264/171.12 |
| 4,058,581 | 11/1977 | Park | 264/136 |
| 4,728,387 | 3/1988 | Hilakos | 156/180 |
| 4,864,964 | 9/1989 | Hilakos | 264/171.13 |
| 4,883,625 | 11/1989 | Glemet et al. | 264/136 |
| 4,937,028 | 6/1990 | Glemet et al. | 264/171.13 |
| 5,268,050 | 12/1993 | Azari | 156/180 |
| 5,433,419 | 7/1995 | Murakami | 264/136 |
| 5,529,652 | 6/1996 | Asai et al. | 156/180 |
| 5,534,210 | 7/1996 | Shirai et al. | 264/171.23 |

FOREIGN PATENT DOCUMENTS

| | | | |
|---|---|---|---|
| 63-132036 | 11/1986 | Japan . | |
| 63-264326 | 4/1988 | Japan . | |
| 1214408 | 8/1989 | Japan | 264/108 |
| 3-183531 | 12/1989 | Japan . | |
| 6-039896 | 7/1992 | Japan . | |
| 6-143440 | 11/1992 | Japan . | |
| 5-50432 | 3/1993 | Japan | 156/180 |

OTHER PUBLICATIONS

International Search Report PCT/JP 94/01370.

*Primary Examiner*—Jeffery R. Thurlow
*Attorney, Agent, or Firm*—Nixon & Vanderhye P.C.

[57] ABSTRACT

Long fiber-reinforced thermoplastic resin compositions are made by passing a loosened continuous fiber bundle web through a coating die having a resin discharge outlet and coating at least one side of upper and lower sides of the web with a thermoplastic resin melt discharged from the resin discharge outlet. The web is pulled from the coating die in a generally horizontal downstream running direction. While the resin-coated continues fiber bundle web is being pulled generally horizontally the resin-coated continuous fiber bundle web is brought into contact with a plurality of upper and lower bars located downstream and outside of the coating die and arranged such that respective contact positions between web and the bars are generally in a horizontal plane, and such that the longitudinal axis of each of the bars is oriented transversely relative to the downstream running direction of the web. In such a manner, the web is impregnated with the resin melt to thereby form a fiber-reinforced composition. Final downstream shaping of the impregnated web may be accomplished downstream of the bars by passing the web through a shaping die.

5 Claims, 2 Drawing Sheets

5,788,908

1

METHOD FOR PRODUCING LONG FIBER-REINFORCED THERMOPLASTIC RESIN COMPOSITION

TECHNICAL FIELD

The present invention relates to a method for producing a long fiber-reinforced thermoplastic resin composition. More particularly, the invention relates to a method for producing a long fiber-reinforced thermoplastic resin composition wherein a web-like (sheet having a substantially fixed width and thickness) continuous fiber bundle is impregnated with a thermoplastic resin melt to form a composite material.

BACKGROUND ART

Japanese Patent Application Laid-open (kokai) No. 63-264326 discloses a method for producing a long fiber-reinforced thermoplastic resin composition. According to the method, fiber bundles are continuously passed through a cross-head die, while a thermoplastic resin melt is discharged into the die so as to impregnate the fiber bundles with the thermoplastic resin melt. This method features easy operation and control of the amount of impregnation with resin.

Japanese Patent Application Laid-open (kokai) No. 63-132036 discloses a method for producing a long fiber-reinforced thermoplastic resin composition without using a cross-head die. According to the method, continuous reinforcing roving fibers are led into a thermoplastic resin melt to contact therewith. Rolls press the roving fibers accompanied by the resin melt to accelerate the permeation of the resin thereinto, after which, the roving fibers impregnated with the resin are drawn through a drawing apparatus to squeeze an excess resin therefrom, thereby obtaining a strand-like fiber-reinforced composite material. Specifically, a thermoplastic resin melt is fed into a die box through a resin melt feed nozzle, while a plurality of continuous reinforcing roving fibers are led from bobbins into the resin melt within the die box via guide rolls.

The method using a cross-head die disclosed in Japanese Patent Application Laid-open (kokai) No. 63-264326 has the drawback that the impregnation with a resin tends to become insufficient. The use of a resin having a low viscosity (low molecular weight) so as to avoid the problem raises problem that only a composition having poorer physical properties is obtained. Also, this involves another problem that fibers passing through a bent portion of a passage in the cross-head die are damaged to the point of breaking due to friction with the metal of the die. This makes it quite difficult to improve various characteristics of a composition produced by adding an inorganic filling to the resin. Further, a related problem is that the die is difficult to clean, which is a practice essential for improving or maintaining quality characteristics of a composition produced.

The method using a die box in place of a cross-head die has the drawback that a resin tends to deteriorate and discolor due to a stagnant resin melt within the die box. Also, the die box is difficult to clean.

The present invention was accomplished in view of the above problems. It is therefore an object of the present invention to solve the above problems and to provide a method for producing a long fiber-reinforced thermoplastic resin composition.

DISCLOSURE OF THE INVENTION

Accordingly, the present invention is drawn to a method for producing a long fiber-reinforced thermoplastic resin composition characterized by comprising the steps of: passing a continuous fiber bundle which has undergone fiber-loosening to have a web-like form through a coating die having a resin discharge outlet so as to coat at least one side of upper and lower sides of the web-like continuous fiber bundle with a thermoplastic resin melt discharged from the resin discharge outlet; and contacting the coated web-like continuous fiber bundle at its upper and lower sides with a plurality of upper and lower bars which are arranged such that positions of contact between the web-like continuous fiber bundle and the bars are generally in a horizontal plane (the case where the positions of contact are in a horizontal plane is included, and this is applied to the rest of the description of the invention), and that the longitudinal axis of each of the bars crosses the running direction of the coated web-like continuous fiber bundle at a point of contact at right angles while pulling the coated web-like continuous fiber bundle from the downstream side in a generally horizontal manner, whereby impregnating the web-like continuous fiber bundle with the thermoplastic resin melt.

The present invention is drawn to a method for producing a long fiber-reinforced thermoplastic resin composition as described above, characterized in that bars each have a curvature relative to the running direction of the web-like continuous fiber bundle in positions of contact with the web-like continuous fiber bundle.

The present invention is also drawn to a method for producing a long fiber-reinforced thermoplastic resin composition as described above, characterized in that the plurality of bars are disposed such that they are contacted with the coated web-like continuous fiber bundle alternately from above and beneath the web-like continuous fiber bundle.

The present invention is also drawn to a method for producing a long fiber-reinforced thermoplastic resin composition as described above, characterized in that the upper bars are integral with one another and the lower bars are integral with one another.

The present invention is further drawn to a method for producing a long fiber-reinforced thermoplastic resin composition as described above, characterized in that after passing through the bars, the fiber bundle impregnated with the resin is passed through a shaping die.

According to the method for producing a long fiber-reinforced thermoplastic resin composition of the present invention, at least one side of upper and lower sides of the web-like continuous fiber bundle is coated with a thermoplastic resin melt discharged from the resin discharge outlet, and the coated web-like continuous fiber bundle is contacted with a plurality of upper and lower bars which are arranged such that positions of contact between the web-like continuous fiber bundle and the bars are generally in a horizontal plane, and that the longitudinal axis of each of the bars crosses the running direction of fiber bundle at a right angle, while pulling the coated web-like continuous fiber bundle from the downstream side in a generally horizontal manner, whereby impregnating the web-like continuous fiber bundle with the thermoplastic resin melt. Accordingly, the fiber bundle is pulled nearly straight without altering its running direction upon contact with each of the bars. As a result, stress hardly acts on a fiber bundle when it contacts with each of the bars. This reduces considerably the probability of breakage of a fiber bundle. Also, as distinct from the methods using a cross-head die and a die box, the method of the present invention hardly causes a resin melt to stagnate, and consequently a stagnant resin colored due to deterioration hardly gets mixed in a product.

Since a fiber bundle is previously loosened to a web-like form, a resin melt can permeate readily and sufficiently and uniformly between fibers of the fiber bundle by carrying out the method of the present invention wherein the fiber bundle coated with a resin melt is contacted with bars while a stress is hardly acting on the fiber bundles.

According to the present invention, the bars each have a curvature relative to the running direction of the web-like continuous fiber bundle in positions of contact with the web-like continuous fiber bundle. This accelerates impregnation stably.

A web-like continuous fiber bundle coming from a coating die contacts a plurality of bars arranged such that they are contacted with the coated web-like continuous fiber bundle alternately from above and beneath the web-like continuous fiber bundle. This accelerates the permeation of a resin melt into the web while maintaining a good balance of permeation between the upper and lower sides thereof.

According to the present invention, the upper bars are integral with one another, and the lower bars are also integral with one another. This allows a user to open/close upper or lower bars by a single operation and improves the alignment of the bars.

Further, according to the present invention, fiber bundles impregnated with a resin are passed through a shaping die. This allows a product to be shaped so as to have an appropriate cross-section and further accelerates impregnation.

BRIEF DESCRIPTION OF THE DRAWINGS

3: Web-like continuous fiber bundle
8: Coating die
9: Resin discharge outlet
12, 14, 16, 18: Upper bars
12a: Positions of contact with upper bars
13, 15, 17: Lower bars
13a: Positions of contact with lower bars Embodiments of a method for producing a long fiber-reinforced thermoplastic resin composition of the present invention will next be described with reference to the drawings. FIG. 1 is a schematic view showing the construction of an embodiment of the method for producing a long fiber-reinforced thermoplastic resin composition of the present invention. In FIG. 1, reference numeral 3 denotes a web-like fiber bundle which has been loosened such that the width direction of a web corresponds to the direction perpendicular to the sheet of FIG. 1. A continuous fiber bundle is preheated and then loosened at a not-shown loosening step. Reference numeral 8 denotes a coating die, and reference numeral 9 denotes a discharge outlet disposed in the coating die 8 for discharging a thermoplastic resin melt under pressure into the die. The web-like continuous fiber bundle 3 which has undergone fiber-loosening passes through the coating die 8 and then is transferred to an impregnation step 19 composed of upper bars 12, 14, 16, and 18 and lower bars 13, 15, and 17, the longitudinal direction of which corresponds to the direction perpendicular to the page of FIG. 1 and to the width direction of the web of a continuous fiber bundle which has undergone fiber-loosening. FIG. 1 shows four upper bars and three lower bars, but the number of upper or lower bars may vary on the order of several to tens depending on the degree of achieved impregnation. As described above, the bars are arranged such that their longitudinal direction crosses the running direction of fibers at a right angle. This does not necessarily mean that they cross precisely at a right angle, but substantially at a right angle.

Figure 1:
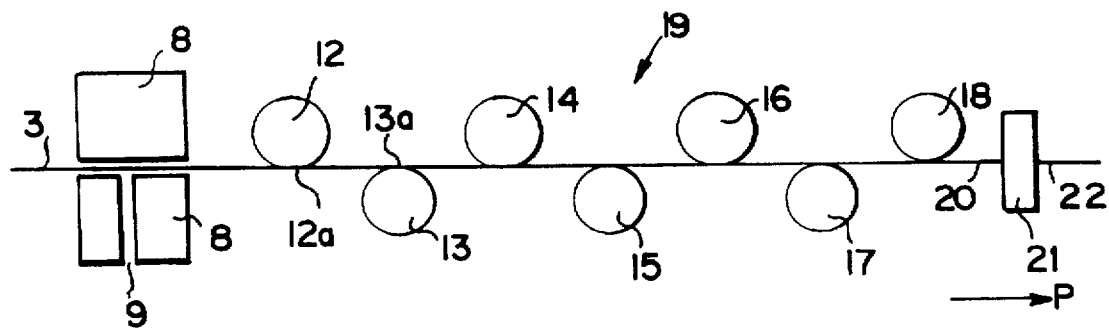
FIG. 1 is a schematic view showing a method for producing a long fiber-reinforced thermoplastic resin composition according to an embodiment of the present invention.

The upper bars 12, 14, 16, and 18 and the lower bars 13, 15, and 17 do not rotate. A downstream end portion 22 of a fiber bundle is pulled in the direction of arrow P, thereby transferring the continuous fiber bundle 3 and a subsequent continuous fiber bundle 20.

The continuous fiber bundle 3 coated with a resin melt coming from the coating die 8 passes between the upper and lower bars, which are arranged such that positions of contact between the bars and the web-like fiber bundle are substantially in a horizontal plane. The positions of contact are, for example, 12a for the bar 12 and 13a for the bar 13 (following the same pattern with remaining bars). Reference numeral 21 denotes a shaping die to form the web which has been completely impregnated into a shape having a predetermined cross-section.

Embodiments of a method for producing a long fiber-reinforced thermoplastic resin composition of the present invention will now be described. A continuous fiber bundle is drawn from a not-shown roving. This fiber bundle may be of high-melting point fibers such as glass fibers, carbon fibers, metal fibers, aromatic polyamide fibers and the like, and continuous fibers may be rovings, yarn and the like. Before entering the coating die 8, the drawn fiber bundle is preheated and then loosened at a not-shown fiber-loosening step to become a web-like continuous fiber bundle. The degree of loosening the fiber bundle is controlled to a predetermined level ranging from an unloosened state to a significantly loosened state. Preferably, the fiber bundle is loosened significantly.

Thus fiber-loosened web-like continuous fiber bundle 3 is continuously led into the coating die 8, while a thermoplastic resin melt is continuously discharged from the discharge outlet 9, thereby continuously coating the fiber bundle 3 with the resin melt, the fiber bundle 3 being disposed like a web whose width direction corresponds to the direction perpendicular to the page of FIG. 1. In FIG. 1, the thermoplastic resin melt is discharged only from beneath the web-like fiber bundle, but may be discharged from above the web-like fiber bundle or both from above and beneath.

The web-like continuous fiber bundle 3 coming from the coating die 8 passes between the upper bars 12, 14, 16, and 18 and the lower bars 13, 15, and 17, the bars having a circular cross-section and being unrotatable. In this way, the permeation of the applied thermoplastic resin between fibers of the web-like continuous fiber bundle 3 is accelerated. The upper bars 12, 14, 16, and 18 and the lower bars 13, 15, and 17 are not necessarily heated as long as the thermoplastic resin is melted on the web-like continuous fiber bundle, but are preferably heated with appropriate heating means such as heaters or the like for accelerating the permeation of the discharged thermoplastic resin into the fiber bundle and for maintaining the thermoplastic resin in a molten state.

A fiber bundle 20 impregnated with a thermoplastic resin melt is preferably transferred to the shaping die 21 where the fiber bundle 20 is shaped to a predetermined cross-section. The shaped fiber bundle is pulled out with a puller, not shown. When the fiber bundle 20 is shaped into a strand form with the shaping die 21, the shaped fiber bundle 22 is usually cut into pellet-like products, each having a predetermined length, with a not-shown pelletizer while being pulled in the direction P. When strand-like products are produced, the pelletizer is not needed. By using the relevant shaping die 21, plate-like, ribbon-like, film-like, tape-like, sheet-like, or strip-like products can be produced. After being processed with the upper bars 12, 14, 16, and 18 and the lower bars 13, 15, and 17 as described above, the fiber bundle may be shaped into strip-like, plate-like, and ribbon-like products without using the shaping die 21. However, the use of the shaping die is preferable because the fiber bundle which has passed through the shaping die 21 has a cross-section different from the one immediately after it has been processed with the upper and lower bars and this shaping permeates the resin melt into the fiber bundle more uniformly and diffusely.

Thermoplastic resins to be permeated into the web-like fiber bundle 3 include polyolefins such as polyethylene, polypropylene and the like, polyesters such as polyethylene terephthalate, polybutylene terephthalate and the like, polyamides such as nylon 6, nylon 66, nylon 11, nylon 12, nylon 610, nylon 612 and the like, and others such as polyacetals, polycarbonates, polyurethanes, polyphenylene sulfides, polyphenylene oxides, polysulfones, polyether ketones, polyetheramides, polyetherimides and the like, and their combinations. There is no restriction on the molecular weight of these resins as long as an appropriate fiber reinforcing effect is exhibited when fibers are impregnated with them. The above-described method using a cross-head die must use a resin having a relatively low viscosity, since a resin melt is also subjected to a large shear force within a cross-head die. By contrast, the present invention does not have such a restriction and accepts resins whose viscosities range widely from a low level to a high level. Accordingly, products formed of a long fiber-reinforced thermoplastic resin composition obtained by the method of the invention generally have excellent mechanical strength.

Various additives may be added to the thermoplastic resins described above according to applications and conditions of use of a resin composition. The additives include antioxidants, antistatic agents, impregnation accelerators, plasticizers, die lubricants, flame retardants, fireproofing aids, crystallization accelerators, colorants, inorganic fillers and the like. Since the method of the present invention features an internal stress generated in a fiber bundle while producing a composition that is much lower than that of the method using a cross-head die or other like methods, adding an inorganic filler to a thermoplastic resin hardly causes formation of "feathers" in a resultant composition. The amount of an inorganic filler added is preferably not more than 100 parts by weight per 100 parts by weight of resin.

Figure 2:
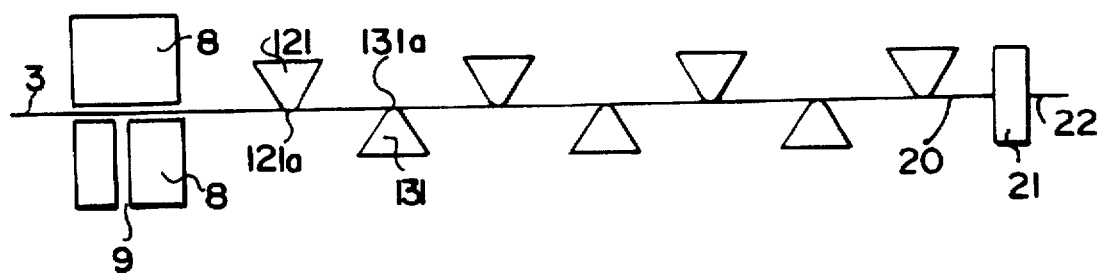
FIG. 2 is a schematic view showing another embodiment of the present invention.

FIG. 2 shows a partially modified embodiment of FIG. 1. That is, the upper and lower bars of FIG. 1 are modified such that their positions of contact with a web-like fiber bundle have an angular cross-section as denoted by reference numerals 121, 131, etc. By altering the cross-sectional curvature of the bars in positions 121a, 131a, etc. of contact according to the type of a thermoplastic resin, a pulling velocity of the downstream end 22 of a web-like fiber bundle, etc., the degree of permeation of a resin into a web-like continuous fiber bundle is controlled.

By giving a horizontally flat shape to the upper bars 121, etc. and the lower bars 131, etc. in positions of contact with a web-like fiber bundle instead of giving a curvature, the duration and area of contact between the bars and the web increase, resulting in more accelerated impregnation.

Figure 3:
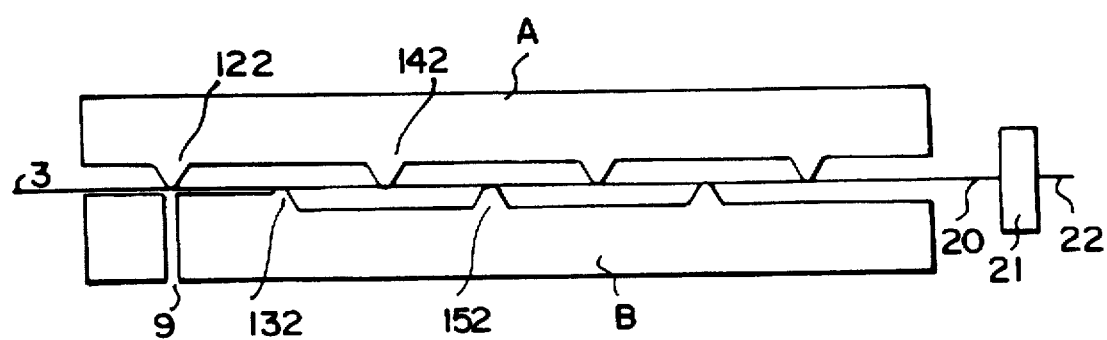
FIG. 3 is a schematic view showing a still further embodiment of the present invention.
Figure 4:
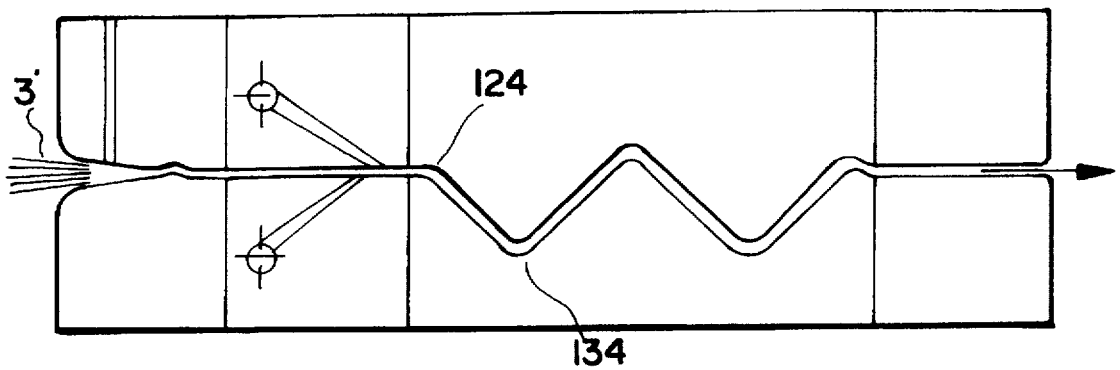
FIG. 4 is a schematic view showing a conventional method using a cross-head die.

FIG. 3 shows still another embodiment of the present invention, wherein the upper bars 122, 142, etc. are integrally supported by an upper bar supporting body A. Likewise, the lower bars 132, 152, etc. are integrally supported by a lower bar supporting body B. In the present embodiment, the upper and lower bars are accurately maintained in place by positioning the integral supporting bodies A and B and are opened by concurrently moving them upward and downward, respectively, for convenience of cleaning and maintenance.

According to the aforesaid conventional method disclosed in Japanese Patent Application Laid-open (kokai) No. 63-264326, protrusions 124, 134, etc. of a cross-die head are not arranged straight, and consequently a roving (fiber bundle) 3' meanders up and down while passing through the die.

As has been described above, according to the method for producing a long fiber-reinforced thermoplastic resin composition of the present invention, a thermoplastic resin melt applied to a fiber bundle which has been loosened to a web-like form permeates between fibers in an accelerated manner without damaging fibers or allowing a deteriorated resin to get mixed in a product.

I claim:

1. A method for producing a long fiber-reinforced thermoplastic resin composition comprising the steps of:
   (i) passing a loosened continuous fiber bundle web through a coating die having a resin discharge outlet and coating at least one side of upper and lower sides of the continuous fiber bundle web with a thermoplastic resin melt discharged from the resin discharge outlet;
   (ii) pulling the resin-coated continuous fiber bundle web from the coating die generally horizontally in a downstream running direction; and
   (iii) while the resin-coated continuous fiber bundle web is being pulled generally horizontally according to step (ii) contacting upper and lower sides of the resin-coated continuous fiber bundle web with a plurality of respective upper and lower bars located downstream of the coating die and arranged such that respective contact positions between the resin-coated continuous fiber bundle web and the bars are generally in a horizontal plane, and such that the longitudinal axis of each of the bars is oriented at a right angle relative to the downstream running direction, thereby impregnating the continuous fiber bundle web with the thermoplastic resin melt.

2. A method for producing a long fiber-reinforced thermoplastic resin composition as defined in claim 1, wherein the bars have a curvature relative to the running direction of the resin coated continues fiber bundle web at the contact positions thereof with the continues fiber bundle web.

3. A method for producing a long fiber-reinforced thermoplastic resin composition as defined in claim 1, wherein the upper and lower bars are disposed so as to respectively alternately contact upper and lower sides of the resin-coated continues fiber bundle web.

4. A method for producing a long fiber-reinforced thermoplastic resin composition as defined in claim 1, wherein the upper bars are integral with one another and the lower bars are integral with one another.

5. A method for producing a long fiber-reinforced thermoplastic resin composition as defined in claim 1, further comprising passing the resin-impregnated continuous fiber bundle web through a shaping die downstream of the bars.

* * * * *